(12) United States Patent
Nemoto

(10) Patent No.: US 10,104,305 B2
(45) Date of Patent: Oct. 16, 2018

(54) IMAGING DEVICE WHICH GENERATES A HIGH-DYNAMIC-RANGE IMAGE USING AN IMAGING ELEMENT IN WHICH PIXEL GROUPS ARE CONTROLLED TO HAVE DIFFERENT EXPOSURE PERIODS

(71) Applicant: OLYMPUS CORPORATION, Hachioji-shi, Tokyo (JP)

(72) Inventor: Kazuhito Nemoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/495,342

(22) Filed: Apr. 24, 2017

(65) Prior Publication Data

US 2017/0230560 A1    Aug. 10, 2017

Related U.S. Application Data

(63) Continuation of application No. PCT/JP2014/079594, filed on Nov. 7, 2014.

(51) Int. Cl.
*H04N 5/235* (2006.01)
*H04N 5/265* (2006.01)

(52) U.S. Cl.
CPC ........... *H04N 5/2352* (2013.01); *H04N 5/265* (2013.01)

(58) Field of Classification Search
CPC ........ H04N 5/232; H04N 5/347; H04N 5/353; H04N 5/355
See application file for complete search history.

(56) References Cited

U.S. PATENT DOCUMENTS 7,825,969 B2 * 11/2010 Tico .................. H04N 5/23248
                                                    348/273
9,894,304 B1 * 2/2018 Smith ................. H04N 5/3742
                              (Continued)

FOREIGN PATENT DOCUMENTS

JP         3110797 B2    11/2000
JP    2004336469 A      11/2004
                              (Continued)

OTHER PUBLICATIONS

International Search Report (ISR) and Written Opinion dated Feb. 3, 2015 issued in International Application No. PCT/JP2014/079594.

*Primary Examiner* — Antoinette Spinks
(74) *Attorney, Agent, or Firm* — Holtz, Holtz & Volek PC

(57) ABSTRACT

An imaging device includes an image acquisition unit that acquires an original image in which pixels with different exposure periods coexist; a corrected-image generating unit that generates corrected images individually for a plurality of pixel groups formed by classifying the pixels according to the exposure periods, the corrected images being generated by interpolating pixel values and executing exposure correction; and an HDR combining unit that combines the corrected images, wherein, in a case where the difference between the pixel value of a pixel belonging to one of the pixel groups, acquired by exposure, and the pixel value of a pixel belonging to another one of the pixel groups, generated by interpolation at the same position as the aforementioned pixel, is greater than a predetermined threshold, the HDR combining unit increases the combining ratio of the pixel in the corrected image belonging to the one of the pixel group.

5 Claims, 14 Drawing Sheets

(56) References Cited

U.S. PATENT DOCUMENTS

| | | | |
|---|---|---|---|
| 2004/0262493 A1 | 12/2004 | Suzuki | |
| 2007/0285547 A1* | 12/2007 | Milligan | H04N 5/35563 348/308 |
| 2009/0091645 A1 | 4/2009 | Trimeche et al. | |
| 2010/0053346 A1 | 3/2010 | Mitsunaga | |
| 2012/0218426 A1* | 8/2012 | Kaizu | H04N 5/35554 348/208.4 |
| 2012/0287294 A1 | 11/2012 | Kaizu et al. | |
| 2013/0051700 A1 | 2/2013 | Jo | |
| 2014/0140617 A1 | 5/2014 | Shigeta | |
| 2014/0247985 A1* | 9/2014 | Park | G06T 5/40 382/170 |
| 2014/0267914 A1* | 9/2014 | Sfaradi | H04N 5/91 348/571 |
| 2014/0313400 A1 | 10/2014 | Kaizu et al. | |
| 2014/0321766 A1 | 10/2014 | Jo | |
| 2015/0097997 A1 | 4/2015 | Mitsunaga | |

FOREIGN PATENT DOCUMENTS

| | | | |
|---|---|---|---|
| JP | 2010539745 | A | 12/2010 |
| JP | 4645607 | B2 | 3/2011 |
| JP | 4661922 | B2 | 3/2011 |
| JP | 2012257193 | A | 12/2012 |
| JP | 2013066142 | A | 4/2013 |
| JP | 2014103559 | A | 6/2014 |
| WO | 2009044246 | A1 | 4/2009 |

\* cited by examiner

IMAGING DEVICE WHICH GENERATES A HIGH-DYNAMIC-RANGE IMAGE USING AN IMAGING ELEMENT IN WHICH PIXEL GROUPS ARE CONTROLLED TO HAVE DIFFERENT EXPOSURE PERIODS

CROSS-REFERENCE TO RELATED APPLICATIONS

This application is a Continuation Application of International Application No. PCT/JP2014/079594 filed on Nov. 7, 2014. The content of International Application No. PCT/JP2014/079594 is hereby incorporated herein by reference in its entirety.

TECHNICAL FIELD

The present invention relates to imaging devices.

BACKGROUND ART

There is a known technology for generating a high-dynamic-range image (hereinafter referred to as HDR image) from multiple images acquired with different exposure levels (e.g., see PTL 1). Although it is common to vary exposure periods as a method of varying exposure levels, blurring due to hand shaking or object movement occurs when the exposure period is long. As a technology for solving this problem, there is a technology for generating an HDR image from data of a single image photographed by an array of imaging elements that are exposed for different periods and that are disposed at each of the pixels (e.g., see PTL 2).

CITATION LIST

Patent Literature

{PTL 1}
Japanese Patent Publication No. 3110797
{PTL 2}
Japanese Patent Publication No. 4645607

SUMMARY OF INVENTION

An aspect of the present invention is an imaging device including an image acquisition unit that acquires an original image in which pixels with different exposure periods coexist; a corrected-image generating unit that generates corrected images individually for a plurality of pixel groups formed by classifying the pixels of the original image according to the exposure periods, the corrected images being generated by interpolating pixel values and executing exposure correction; and an HDR combining unit that combines the corrected images respectively generated for the plurality of pixel groups by the corrected-image generating unit, wherein, in a case where a difference between the pixel value of a pixel in the corrected image belonging to one of the pixel groups, in which the pixel value is acquired by exposure, and the pixel value of a pixel in the corrected image belonging to another one of the pixel groups, in which the latter pixel value is generated by interpolation at the same position as the former pixel, is greater than or equal to a predetermined threshold, the HDR combining unit increases a combining ratio by which the pixel in the corrected image belonging to the one of the pixel groups is combined.

DESCRIPTION OF EMBODIMENTS

An imaging device 1 according to a first embodiment of the present invention will be described below with reference to the drawings.

Figure 1:
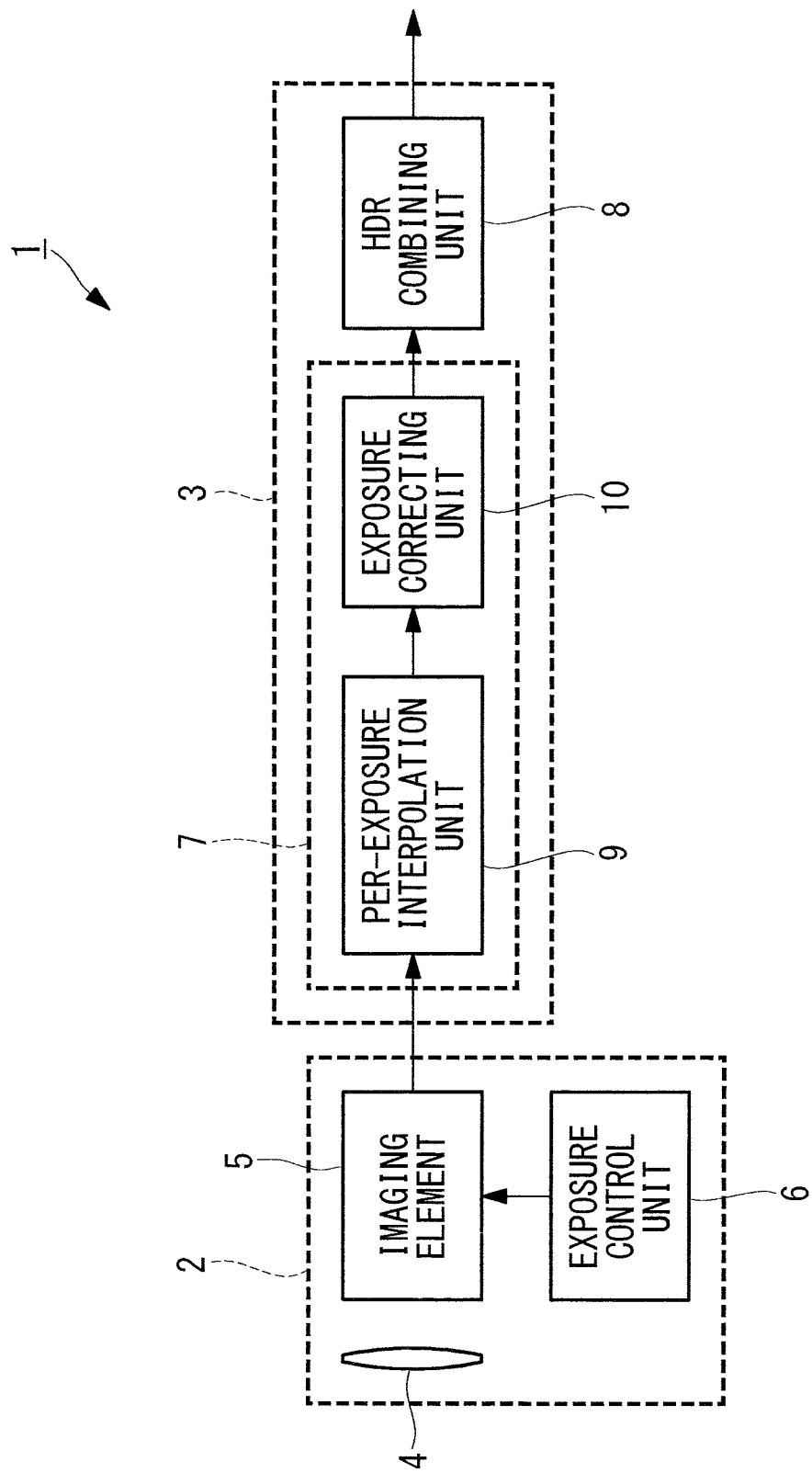
FIG. 1 is a block diagram showing an imaging device according to a first embodiment of the present invention.

As shown in FIG. 1, the imaging device 1 according to this embodiment includes an imaging unit (image acquisition unit) 2 that acquires image signals and an image processing unit 3 that processes the image signals acquired by the imaging unit 2.

The imaging unit 2 includes an imaging lens 4 that collects light coming from an object, an imaging element 5 that captures an image formed of light collected by the imaging lens 4, and an exposure control unit 6 that controls the exposure periods for the individual pixels of the imaging element 5.

For example, the imaging element 5 is a CMOS image sensor formed of a two-dimensional array of a plurality of photoelectric conversion elements and is configured to form an optical image of the object by using a light collecting lens.

The exposure control unit 6 sets the exposure periods for the individual pixels. The individual pixels of the imaging element 5 are configured such that the amounts of light received thereat during the exposure periods set therefor by the exposure control unit 6 are converted into the amounts of charges of the individual photoelectric conversion elements. Furthermore, the imaging element 5 is configured to output two-dimensional image data (original image) obtained by executing processing such as optical black processing, and by converting the results into digital values.

Figures 2, 3:
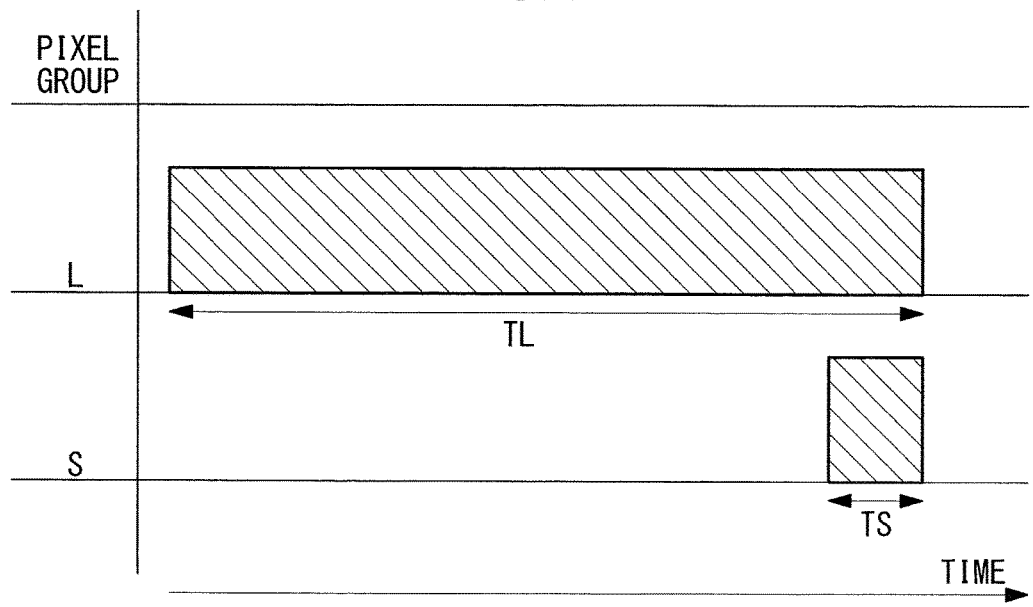
FIG. 2 is an illustration showing an array of pixel groups L and S in an imaging element of the imaging device in FIG. 1.
FIG. 3 is a chart showing an example of exposure timings for the individual pixel groups of the imaging element in FIG. 2.

FIG. 2 shows an example of the array of photoelectric conversion elements of the imaging element 5. The photoelectric conversion elements each belong to either one of the two pixel groups (L, S) and are wired such that it is possible to control the exposure periods at least on a per-pixel-group basis. The numbers of pixels in the two pixel groups are substantially equal, and the pixels constituting each of the pixel groups are arrayed regularly and uniformly so that an image formed by each of the pixel groups alone can properly represent the whole object.

In order to simplify the following explanation, it is assumed that the imaging element 5 has photoelectric conversion elements for grayscale light or monochrome light in this embodiment.

The exposure control unit 6 is configured to receive an appropriate exposure period TP and an imaging instruction from a control unit that is not shown, to set exposure timings for the photoelectric conversion elements, and to output acquired pixel values (hereinafter referred to as exposed pixel values) to the image processing unit 3.

Regarding the exposure timings that are set for the photoelectric conversion elements, for example, in the case where the dynamic range (DR) is to be increased eightfold, the exposure periods are set so as to have an eightfold difference, as shown in FIG. 3. Here, the amount of extension on the low-luminance side is set to be greater, wherein, with reference to the appropriate exposure period TP, the exposure period TL for the pixel group L for longer exposure is set to be TP×4, and the exposure period TS for the pixel group S for shorter exposure is set to be TP×0.5.

In the example shown in FIG. 3, the exposure timings are set such that the TS period is included in the TL period, which inhibits the occurrence of positional deviations due to movement of the object, and the like between the pixels of the pixel group L and the pixels of the pixel group S.

Figure 4:
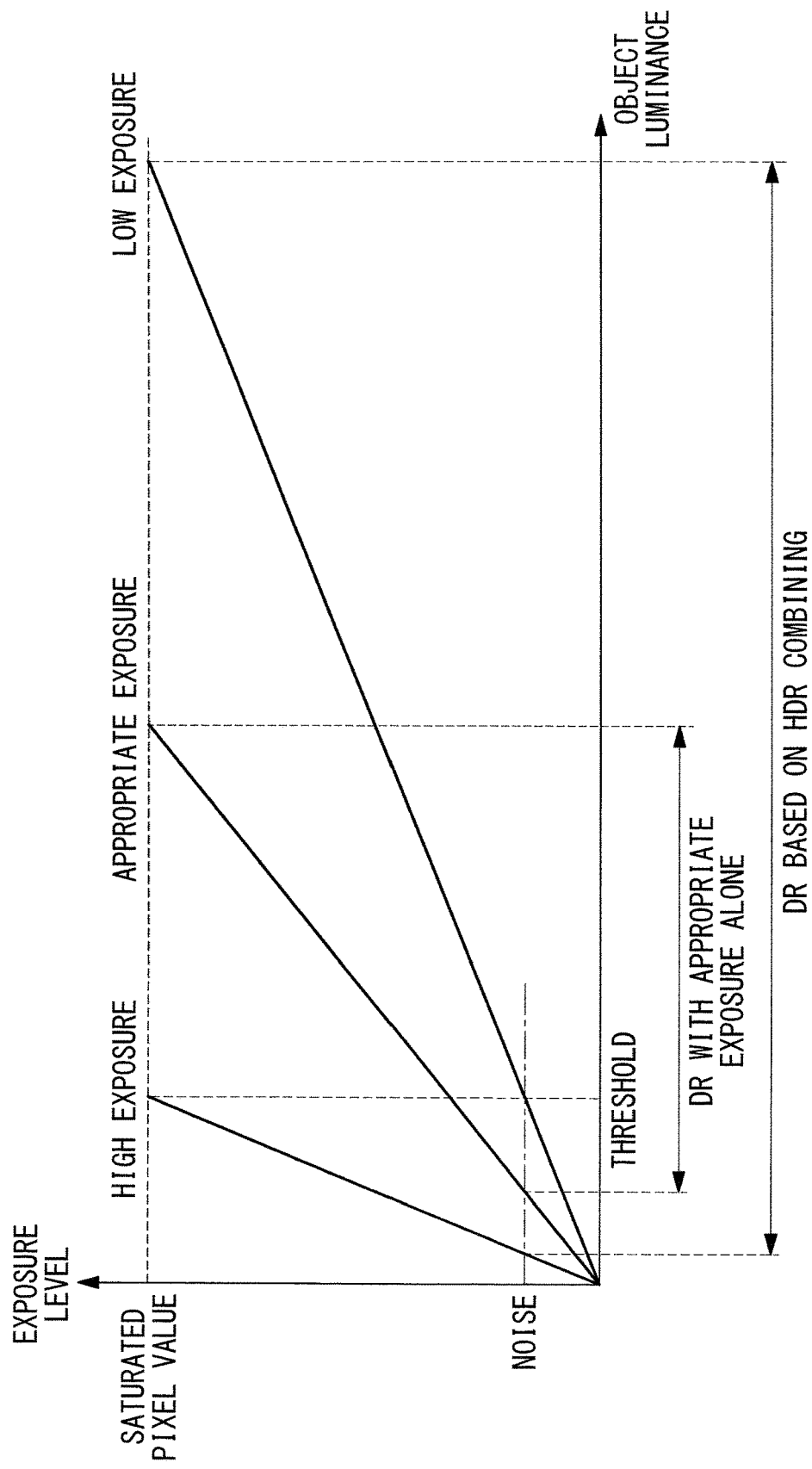
FIG. 4 is a chart showing a relationship between the exposure levels and dynamic ranges of the individual pixel groups of the imaging element in FIG. 1.

By combining the pixel values of the two pixel groups having different exposure periods, it is possible to extend the dynamic range compared with the case of appropriate exposure, as shown in FIG. 4.

The image processing unit 3 includes a corrected-image generating unit 7 and an HDR combining unit 8.

The corrected-image generating unit 7 includes a per-exposure interpolation unit (interpolated-image generating unit) 9 and an exposure correcting unit 10.

Figure 5A:
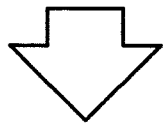
FIG. 5A is an illustration showing a pixel group of longer exposure and an interpolated image thereof generated by a per-exposure interpolation unit in FIG. 1.
Figure 5B:
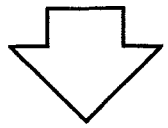
FIG. 5B is an illustration showing a pixel group of shorter exposure and an interpolated image thereof generated by the per-exposure interpolation unit in FIG. 1.

As shown in FIGS. 5A and 5B, the per-exposure interpolation unit 9 interpolates pixels L' and S' for which exposed pixel values have not been obtained individually in each of the pixel groups L and S, thereby generating interpolated images for each of the exposure levels.

The exposure correcting unit 10 executes level correction (exposure correction) in accordance with the exposure periods and for the interpolated images of the individual pixel groups L and S so as to match the exposure levels between these pixel groups, thereby generating a corrected image.

In the above example, the ratio R of the exposure periods of the individual pixel groups L and S is R=TL/TS=8. It is possible to match the exposure levels of both pixel groups by multiplying the individual pixel values VS of the interpolated image of the pixel group S by R. That is, the same object exhibits substantially the same values. It is to be noted that, in the case where the pixel values are represented in the form of digital integer data, the pixel values after exposure correction must be extended to the high-order side by three bits compared with the pixel values before correction.

The HDR combining unit 8 is configured to combine the corresponding pixels of the interpolated images of the individual pixel groups L and S at the corresponding positions with each other according to the following procedure to generate a single HDR image.

Figure 6:
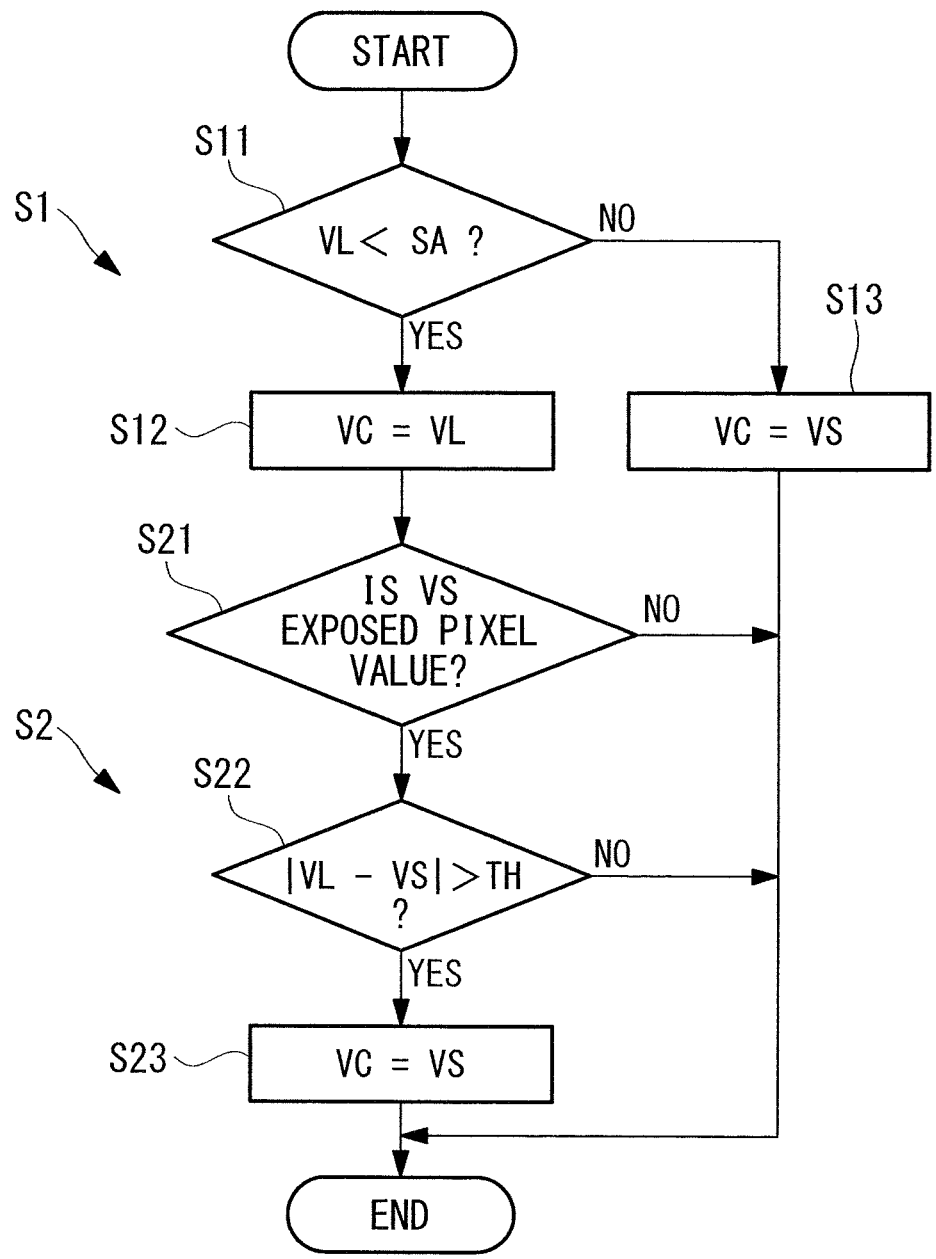
FIG. 6 is a flowchart of a method of generating an HDR image.

Specifically, as shown in FIG. 6, first, combined pixel values are calculated similarly to normal HDR combining (step S1).

In step S1, first, it is determined whether VL<SA (step S11). In the case where VL<SA, VC is set to be VC=VL (step S12), and otherwise, i.e., in the case where VL=SA, VC is set to be VC=VS (step S13).

Here, VL signifies the pixel value after exposure correction of a pixel in the pixel group L, VS signifies the pixel value after exposure correction of a pixel of interest in the pixel group S, SA signifies the pixel value obtained by subtracting the optical black value from the maximum allowable value of the photoelectric conversion element (hereinafter referred to as saturated pixel value), and VC signifies the combined pixel value.

In step S1, the pixel value VS of shorter exposure is chosen in a bright region, where the pixel value VL of longer exposure is saturated, whereby the dynamic range on the high-luminance side is extended. Furthermore, the pixel value VL is basically chosen in a dark region, where the pixel value VL is not saturated, thereby lowering the noise floor, whereby the dynamic range on the low-luminance side is extended.

Then, in the case where VL<SA is determined and VC=VL is chosen in step S1, the HDR combining unit 8 proceeds to step S2.

In step S2, it is determined whether or not the pixel value VS of shorter exposure is an exposed pixel value (step S21). In the case where the pixel value VS is an exposed pixel value, it is determined whether or not the absolute value of difference between the pixel value VL and the pixel value VS is greater than a predetermined threshold TH (step S22).

In the case where |VL−VS|>TH, the pixel value VS of shorter exposure is chosen as the combined pixel value VC (step S23).

In the case where the pixel value VS is not an exposed pixel value and in the case where |VL−VS|≤TH, VC=VL is maintained.

The operation of the thus-configured imaging device 1 according to this embodiment will be described below.

In order to photograph an object by using the imaging device 1 according to this embodiment, the imaging lens 4 is directed toward the object to collect light coming from the object by the imaging lens 4, and the collected light is photographed by the imaging element 5.

In the imaging element 5, the exposure periods of the individual pixels are controlled by the exposure control unit 6, whereby the amounts of light received during the set exposure periods are converted into amounts of charges by the individual photoelectric conversion elements, and two-dimensional image data obtained by executing processing such as optical black processing and then converting the results into digital values is output.

In the image data, each of the pixels belong to either one of the two pixel groups L and S, and it is possible to properly represent the whole object with the two pixel groups.

The output image data is sent to the image processing unit 3, in which the corrected-image generating unit 7 generates a corrected image. Specifically, the per-exposure interpolation unit 9 interpolates pixels L' and S' for which exposed pixel values have not been obtained for the individual pixel groups L and S, thereby generating interpolated images. Then, the interpolated images for the individual pixel groups L and S are sent to the exposure correcting unit 10, where level correction is executed in accordance with the exposure periods, whereby corrected images in which the exposure levels are matched between the two pixel groups are generated.

The corrected images generated for the individual pixel groups are sent to the HDR combining unit 8. In step S1, each pixel value VL of the pixel group L of longer exposure is compared with the saturated pixel value SA. If VL=SA, the pixel value VS is chosen as the combined pixel value VC, and if VL<SA, the pixel value VL is basically chosen as the combined pixel value VC. In step S2, it is determined whether or not the absolute value of difference between the (interpolated) pixel value VL and the (exposed) pixel value VS is greater than the predetermined threshold TH. In the case where |VL−VS|>TH as a result of determination, the combined pixel value VC=VS for the relevant pixel.

Here, a description will be given in the context of an example where the frequency of the luminance distribution of the object on the imaging element 5 is close to the Nyquist frequency based on the pixel pitch.

Figure 7A:
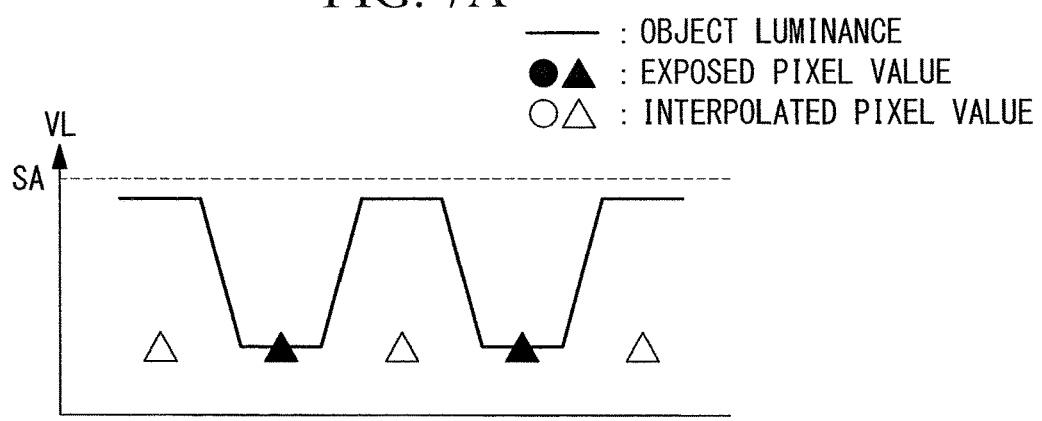
FIG. 7A is a chart showing exposed pixel values, interpolated pixel values, and an object luminance distribution in the case of longer exposure.
Figure 7B:
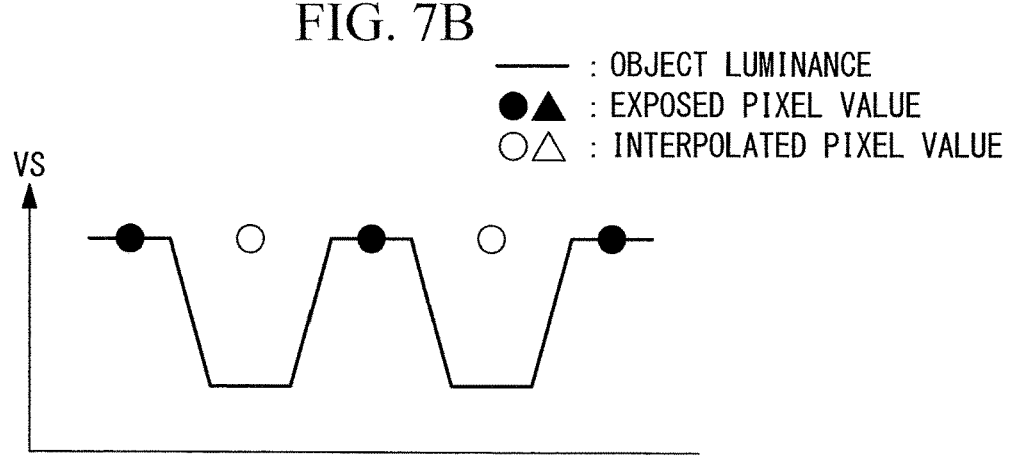
FIG. 7B is a chart showing exposed pixel values, interpolated pixel values, and an object luminance distribution in the case of shorter exposure.

In the case where the varying luminance distribution is less than the saturated pixel value SA, the pixel values VL of longer exposure are interpolated as shown in FIG. 7A, and the pixel values VS of shorter exposure are interpolated as shown in FIG. 7B. In the figures, solid lines represent the luminance distribution of the object, broken lines represent the threshold SA, black solid plots represent exposed pixel values, and white outlined plots represent interpolated pixel values.

Figure 7C:
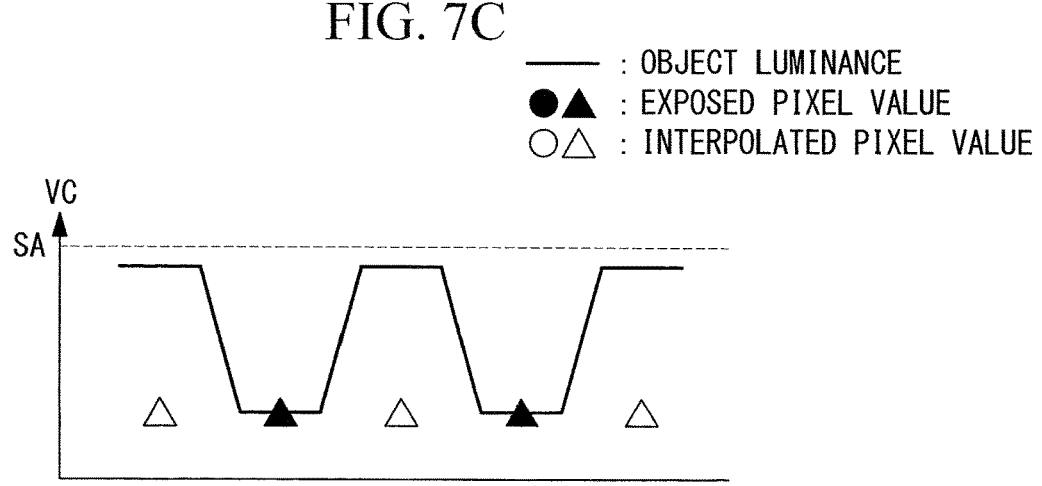
FIG. 7C is a chart showing combined pixel values and an object luminance distribution before correction by the imaging device in FIG. 1.

In this state, the interpolated pixel value does not reflect the luminance distribution of the object in either case. Furthermore, FIG. 7C shows a state in which step S1 is first executed for the pixel groups L and S, and VL<SA holds and thus VC=VL. Also in this state, the combined pixel value VC does not reflect the luminance distribution of the object. In this embodiment, step S2 is further executed, in which it is determined whether or not |VL−VS|>TH for the (exposed) pixel value VS of shorter exposure.

Figure 7D:
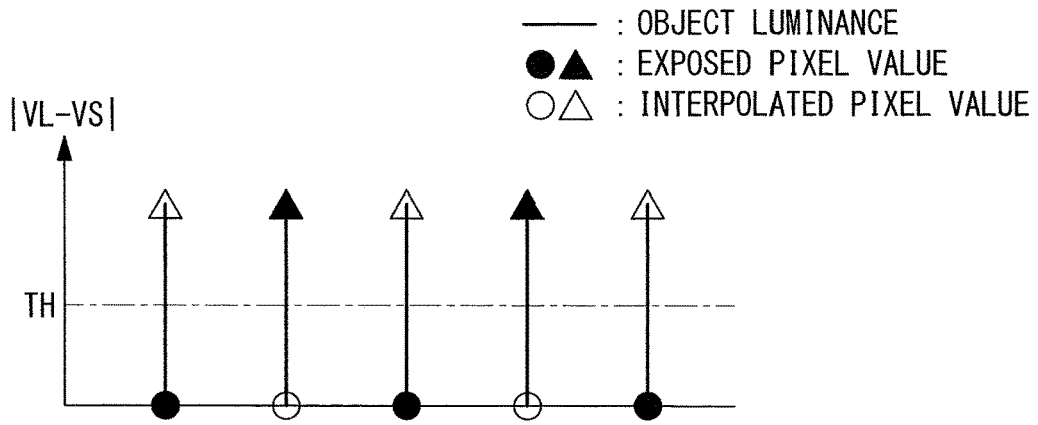
FIG. 7D is a chart showing differences between exposed pixel values and interpolated pixel values.
Figure 7E:
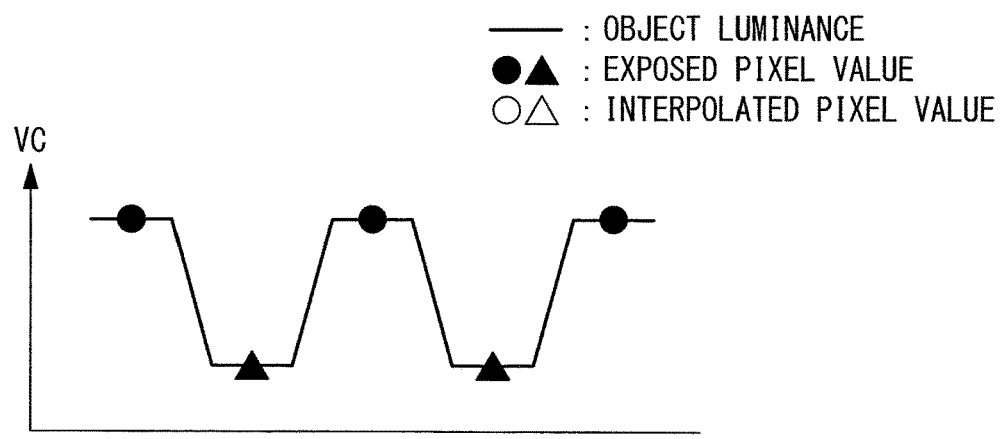
FIG. 7E is a chart showing combined pixel values and an object luminance distribution after correction by the imaging device in FIG. 1.

FIG. 7D shows |VL−VS|. According to the figure, |VL−VS|>TH holds for every pixel, and thus VC=VS is chosen at each pixel L'. Thus, the combined pixel value VC precisely reflects the luminance distribution of the object, as shown in FIG. 7C.

Figure 8A:
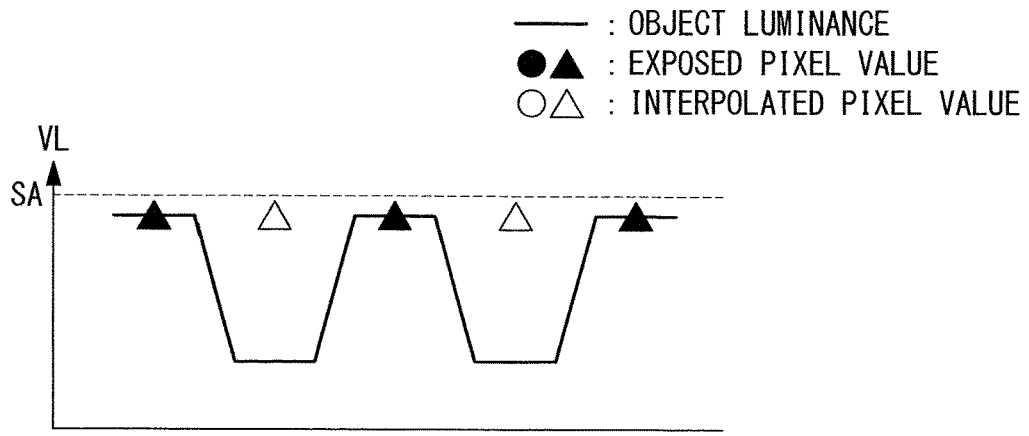
FIG. 8A is a chart showing the case where, in FIG. 7A, the pixel values in the pixel group of longer exposure and the pixel values in the pixel group of shorter exposure are exchanged.
Figure 8B:
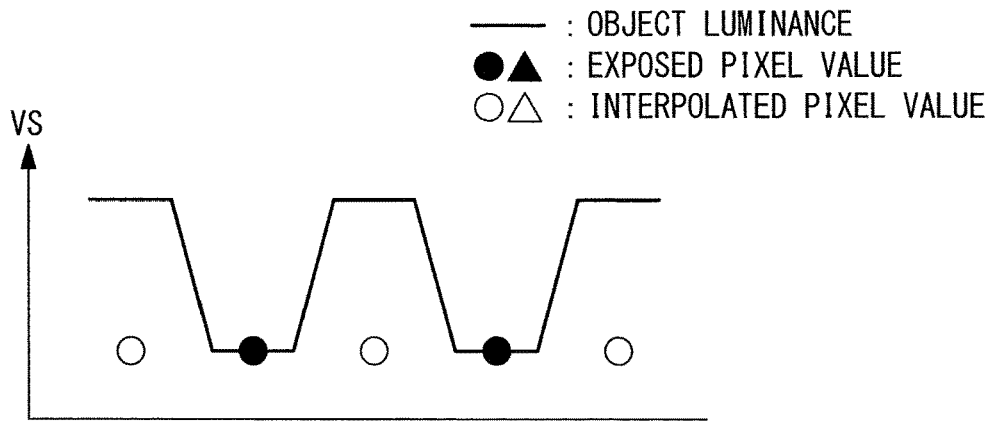
FIG. 8B is a chart showing the case where, in FIG. 7B, the pixel values in the pixel group of longer exposure and the pixel values in the pixel group of shorter exposure are exchanged.
Figure 8C:
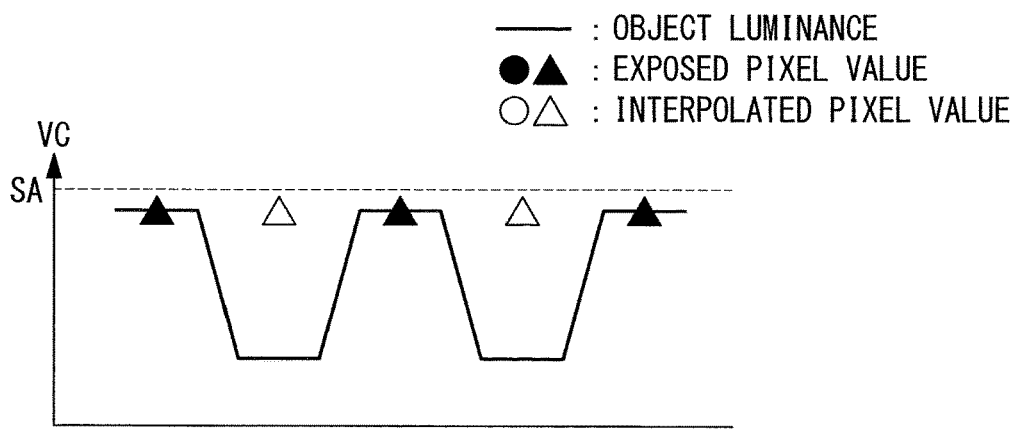
FIG. 8C is a chart showing the case where, in FIG. 7C, the pixel values in the pixel group of longer exposure and the pixel values in the pixel group of shorter exposure are exchanged.
Figure 8D:
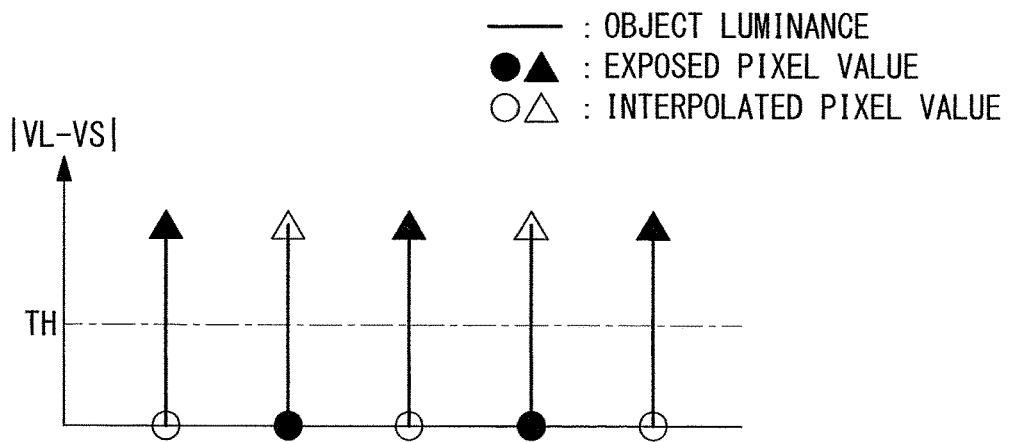
FIG. 8D is a chart showing the case where, in FIG. 7D, the pixel values in the pixel group of longer exposure and the pixel values in the pixel group of shorter exposure are exchanged.
Figure 8E:
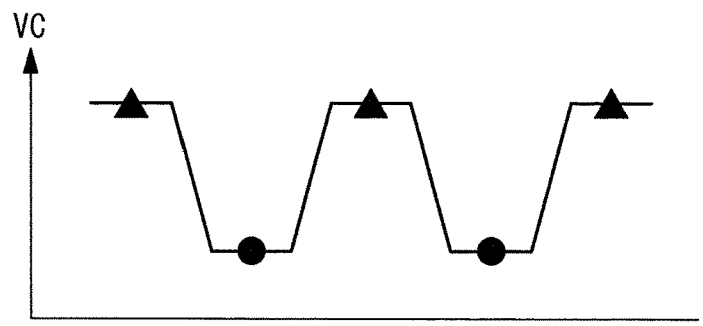
FIG. 8E is a chart showing the case where, in FIG. 7E, the pixel values in the pixel group of longer exposure and the pixel values in the pixel group of shorter exposure are exchanged.

FIGS. 8A to 8E show an example of the case where the luminance values are exchanged between the pixel groups L and S, compared with the case of FIGS. 7A to 7E. Also in this case, the pixel values do not reflect the luminance distribution of the object in the state where step S2 is not executed, as shown in FIGS. 8A to 8C; however, as a result of executing step S2, the combined pixel values VC precisely reflect the luminance distribution of the object, as shown in FIG. 8E.

As described above, with the imaging device 1 according to this embodiment, an advantage is afforded in that it is possible to simply obtain an HDR image having a resolution corresponding to the pixel pitch of the imaging element 5 from signals acquired by the imaging element 5 in which pixels that are exposed over different exposure periods are provided.

In the image processing unit 3, processing such as gray-level transformation suitable for the combined pixel values VC having a dynamic range extended in the HDR combining unit 8 is executed before executing processing such as displaying or saving.

Here, as a comparative example, a method in which a combined pixel value VC is determined by using two thresholds will be described.

Here, as step 2', each pixel value VS in the pixel group S is compared with a threshold THB, and VC=VS is adopted instead of VC=VL in the case where VS>THB.

Figure 9A:
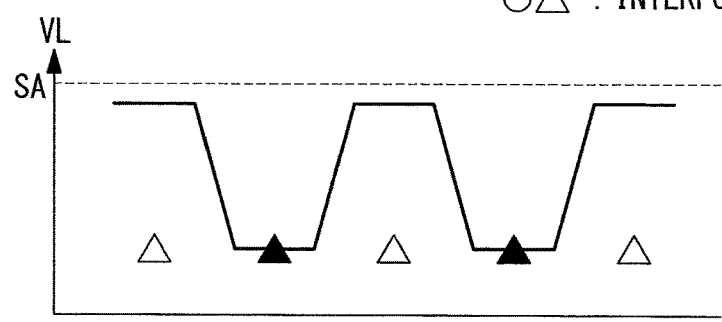
FIG. 9A is a chart showing, as a comparative example, exposed pixel values, corresponding interpolated pixel values, and a corresponding object luminance distribution in the case of longer exposure.
Figure 9B:
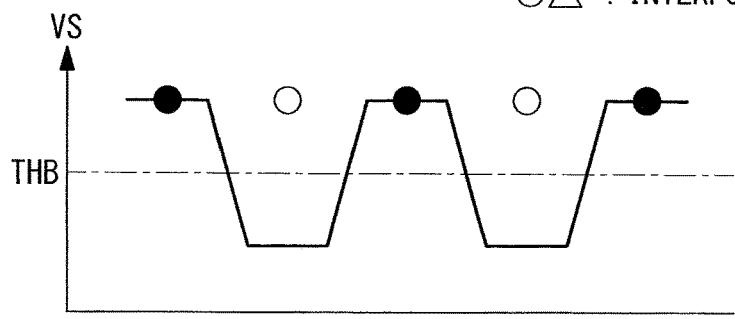
FIG. 9B is a chart showing, as a comparative example, exposed pixel values, corresponding interpolated pixel values, and a corresponding object luminance distribution in the case of shorter exposure.
Figure 9C:
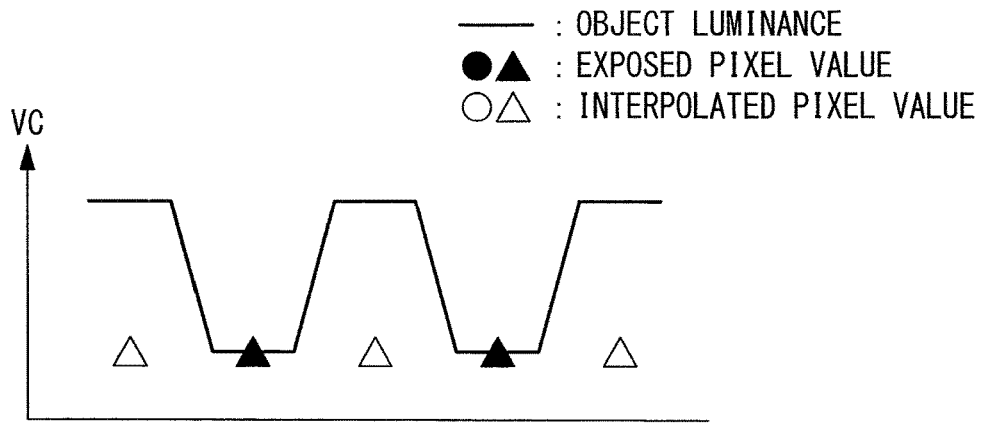
FIG. 9C is a chart showing, as a comparative example, combined pixel values and a corresponding object luminance distribution before correction.
Figure 9D:
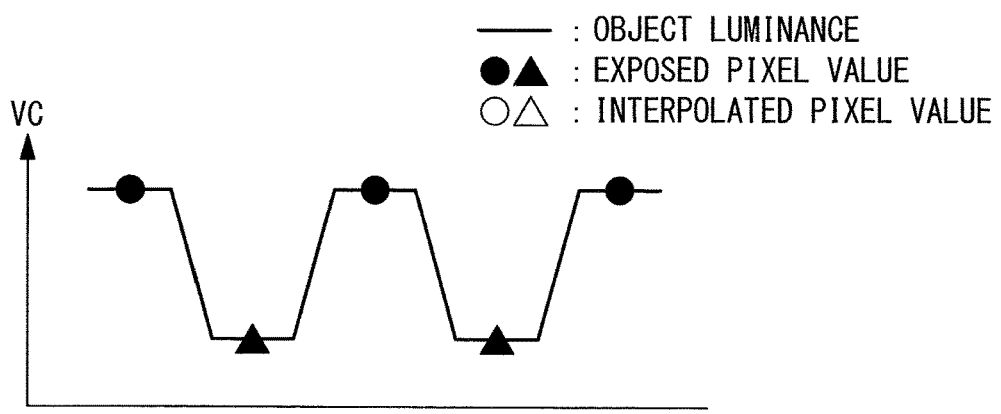
FIG. 9D is a chart showing, as a comparative example, combined pixel values and a corresponding object luminance distribution after correction.
Figure 10A:
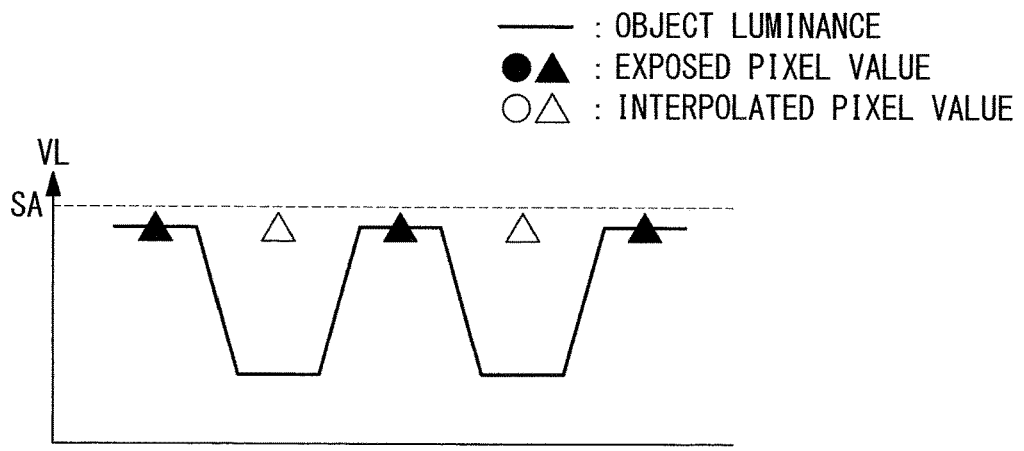
FIG. 10A is a chart showing the case where, in FIG. 9A, the pixel values in the pixel group of longer exposure and the pixel values in the pixel group of shorter exposure are exchanged.
Figure 10B:
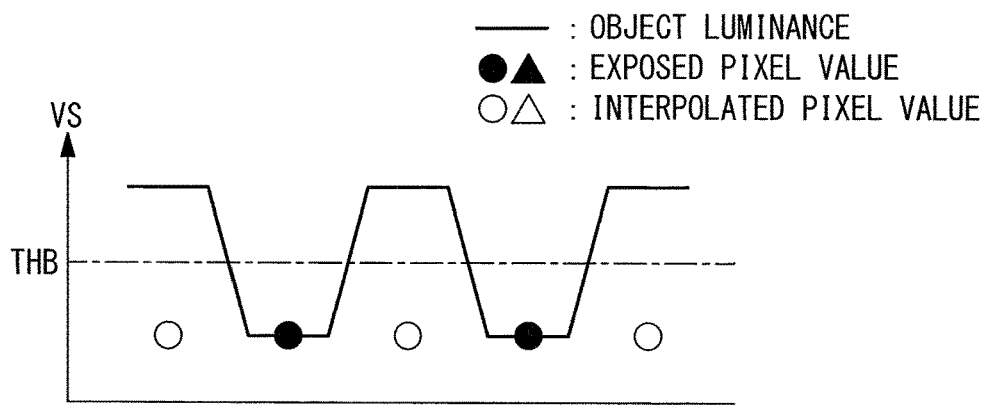
FIG. 10B is a chart showing the case where, in FIG. 9B, the pixel values in the pixel group of longer exposure and the pixel values in the pixel group of shorter exposure are exchanged.
Figure 10C:
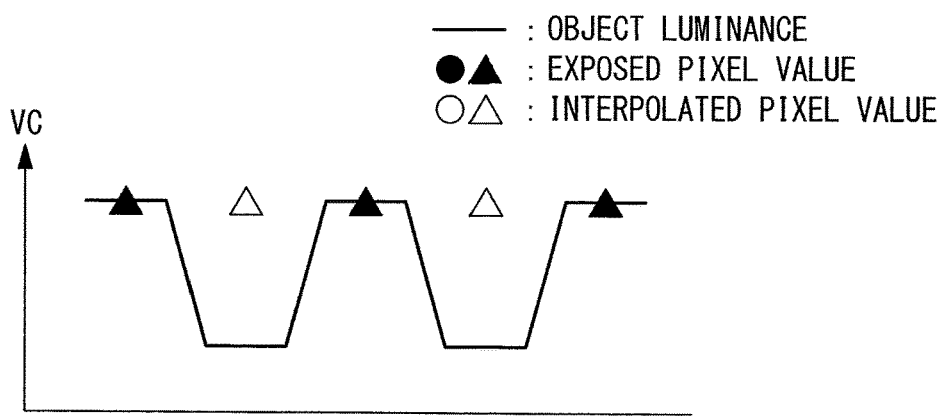
FIG. 10C is a chart showing the case where, in FIG. 9C, the pixel values in the pixel group of longer exposure and the pixel values in the pixel group of shorter exposure are exchanged.
Figure 10D:
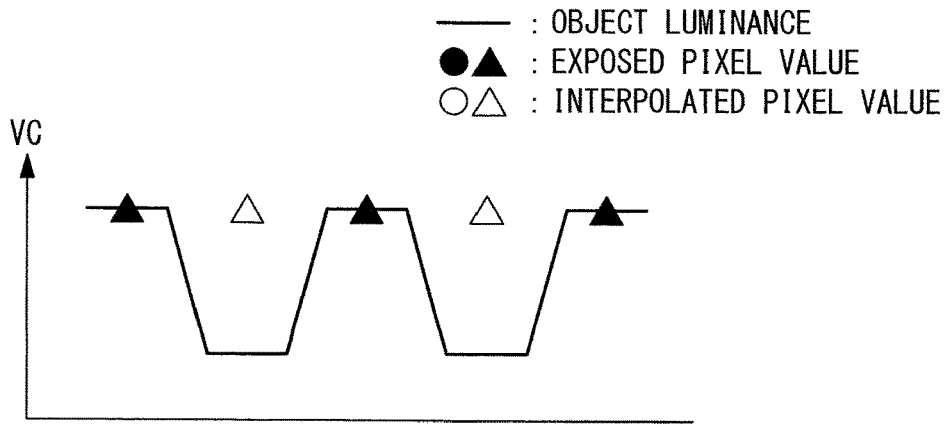
FIG. 10D is a chart showing the case where, in FIG. 9D, the pixel values in the pixel group of longer exposure and the pixel values in the pixel group of shorter exposure are exchanged and thus combined pixel values do not reflect an object luminance distribution.

In the example shown in FIGS. 9A to 9D, since VS>THB, as shown in FIG. 9B, VC=VS is chosen, and thus the luminance distribution of the object is reflected. On the other hand, in the example shown in FIGS. 10A to 10D, since VS≤THB, VC=VL is chosen, and thus the luminance distribution of the object is not reflected.

That is, in the method of the comparative example, in which pixel values are compared with the threshold, depending on the magnitudes of the pixel values, there are cases where a combined image not reflecting the luminance components of the object is generated.

In contrast, according to the present invention, there is no such shortcoming; that is, an advantage is afforded in that it is possible to generate a combined image so as to reflect the luminance distribution of the object in all cases, irrespective of the magnitudes of the pixel values.

Although two exposure levels are involved in the embodiment described above, similar processing can be executed with three or more exposure levels.

That is, given N exposure levels, pixel values after exposure correction are signified by Vi (exposure level number i=1, 2, . . . , N) sequentially from the shortest exposure side, the saturated pixel value with the exposure level number i is signified by SAi, and exposure correction is executed with reference to one of the exposure levels.

Letting the exposure level number of a pixel of interest be signified by j, the combined pixel value VC of the pixel of interest is:

$$VC=Vk$$

Here, k is the greatest exposure level number satisfying k≥j, Vk<SAk, and |Vk−Vj|>TH (in the case of Vj=SAj, k is the greatest exposure level number satisfying Vk<SAk).

The case of N=2 is the same as the case where the pixel value VS in the embodiment is considered as the pixel value V1 and the pixel value VL in the embodiment is considered as the pixel value V2.

Furthermore, although the imaging element 5 includes photoelectric conversion elements for grayscale light or monochrome light in the embodiment described above, alternatively, in the case where the imaging element 5 is formed of a Bayer pattern of pixels in the three primary colors of RGB, each unit of "two G pixels (Gr, Gb), an R pixel, and a B pixel" is to be assigned to either one of the pixel groups, and similar processing is to be executed for each of RGB.

Furthermore, the pixels in the three primary colors of RGB may be converted into YC (luminance and hue) pixels with the vertical and horizontal numbers of pixels reduced to half, and the Y values may be used as the pixel values. Furthermore, the exposure levels for Gb pixels and Gr pixels may be varied, and in the case where a G pixel on the higher-exposure side is saturated, correction may be executed for a G pixel on the lower-exposure side.

Furthermore, although level correction processing is executed after interpolation processing in the embodiment, the order of interpolation processing in the per-exposure interpolation unit 9 and the level correction processing in the exposure correcting unit 10 in the image processing unit 3 may be reversed.

Next, an imaging device according to a second embodiment of the present invention will be described below with reference to the drawings.

In the description of this embodiment, parts that are configured the same as those in the imaging device 1 according to the first embodiment described above will be designated by the same reference signs, and descriptions thereof will be omitted.

In the imaging device according to this embodiment, instead of adopting either a pixel value VL of longer exposure or a pixel value VS of shorter exposure as a combined pixel value VC, these pixel values are combined using a combining ratio α.

That is, a combined pixel value VC can be expressed by using the combining ratio α as:

$$VC=VL\times\alpha+VS\times(1-\alpha)$$

Figure 11:
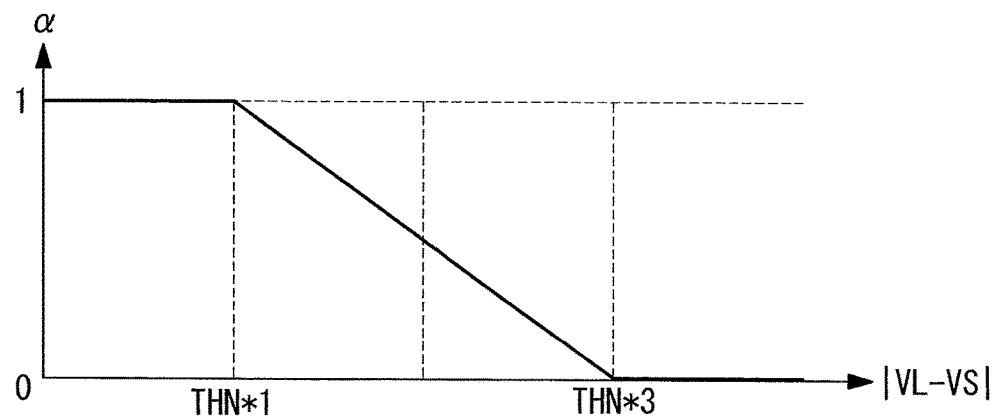
FIG. 11 is a graph showing a combining ratio between pixel values of longer exposure and pixel values of shorter exposure in an imaging device according to a second embodiment of the present invention.

Here, as shown in FIG. 11, the combining ratio α is set as follows.

In the case where |VL−VS|≤THN×1, α=1. In the case where THN×1<|VL−VS|≤THN×3, α=|VL−VS|/(THN×2). In the case where THN×3≤|VL−VS| and in the case where VL=SA, α=0.

Figure 12:
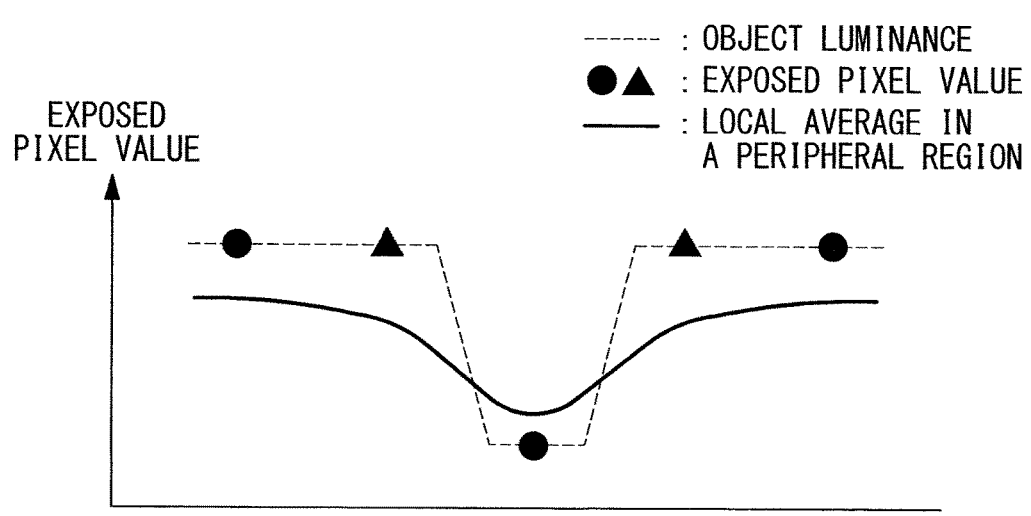
FIG. 12 is an example of an object luminance distribution and a graph showing local averages.
Figure 13:
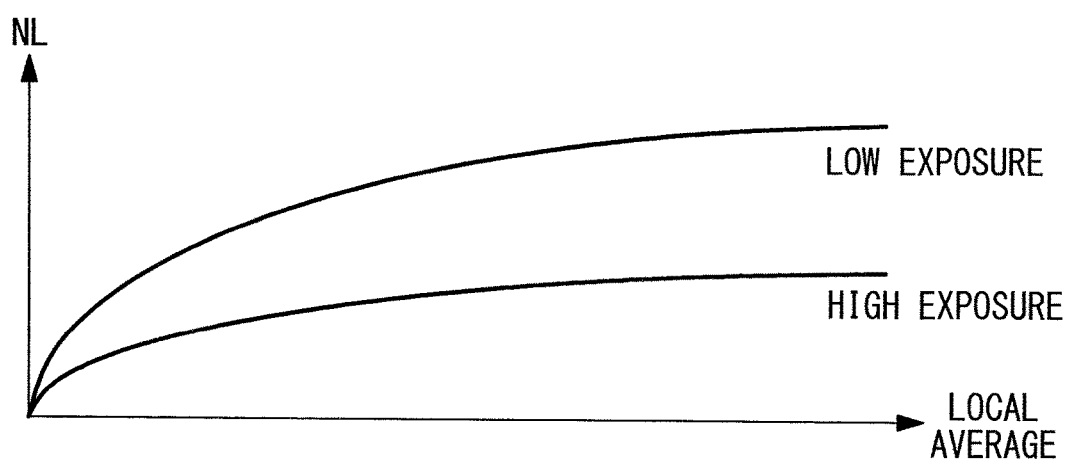
FIG. 13 is a chart showing an example of a noise model associated with the imaging device in FIG. 11.

Here, as shown in FIG. 12, THN is a value that is K times as large as a noise level NL calculated from the value of a pixel of interest or a local average in a peripheral region thereof (contrast value). K is a coefficient. Assuming that shot noise follows a Gaussian distribution in which the standard deviation is the noise level, it is possible to set the noise level NL by using a distribution equation for shot noise observed in photometry or pixel-value data actually acquired by the imaging element 5. As shown in FIG. 13, the noise level NL also varies depending on which of the pixel groups an exposed pixel value belongs to.

It is possible to adjust the perception of resolution and the perception of noise in a combined image by adjusting the coefficient K.

It will be understood that, as the coefficient K is decreased, the true resolution in regions of low contrast (the level of difference in luminance values between pixels in the neighborhood) is more likely to be reflected but noise is likely to increase since VL can also be replaced with VS, due to pixel-value differences caused by noise.

Conversely, as the coefficient K is increased, the true resolution in regions of low contrast is less likely to be reflected but the amount of noise included in the results will be reduced since VL including less noise is maintained.

Furthermore, the threshold may be controlled in accordance with the magnitude of contrast in a local region. Specifically, when calculating a local average, as described above, by simultaneously obtaining a variance and exercising control such that the threshold THN is increased as the variance becomes smaller, i.e., as the image in the region becomes more flat, replacement of pixel values due to noise becomes less likely to occur in regions of low contrast (regions of small variance). This serves to suppress an increase in noise in regions of low contrast, where noise tends to matter.

As described above, with the imaging device according to this embodiment, considering that differences between interpolated pixel values and exposed pixel values in a region of interest occur due to noise as well as interpolation errors, it becomes possible to correct those differences, thereby generating an HDR image precisely reflecting the luminance distribution of an object.

The following aspects include the aforementioned embodiments.

An aspect of the present invention is an imaging device including an image acquisition unit that acquires an original image in which pixels with different exposure periods coexist; a corrected-image generating unit that generates corrected images individually for a plurality of pixel groups formed by classifying the pixels of the original image according to the exposure periods, the corrected images being generated by interpolating pixel values and executing exposure correction; and an HDR combining unit that combines the corrected images respectively generated for the plurality of pixel groups by the corrected-image generating unit, wherein, in a case where a difference between the pixel value of a pixel in the corrected image belonging to one of the pixel groups, in which the pixel value is acquired by exposure, and the pixel value of a pixel in the corrected image belonging to another one of the pixel groups, in which the latter pixel value is generated by interpolation at the same position as the former pixel, is greater than or equal to a predetermined threshold, the HDR combining unit increases a combining ratio by which the pixel in the corrected image belonging to the one of the pixel groups is combined.

According to this aspect, when an original image in which pixels with different exposure periods coexist has been obtained by the image acquisition unit, the corrected-image generating unit generates corrected images individually for a plurality of pixel groups formed by classifying the pixels of the original image according to the exposure periods, the corrected images being generated by interpolating pixel values and executing exposure correction. Then, the HDR combining unit combines the plurality of corrected images to generate a combined image having an extended dynamic range.

In this case, in each of the corrected images for the individual pixel groups, pixels are generated by interpolation between pixels acquired by exposure, and thus, at the positions corresponding to pixels generated by interpolation of the corrected image for one pixel group, pixels, acquired by exposure, of the corrected image for another pixel group exist. Furthermore, in the case where the difference between the values of these pixels is greater than or equal to the predetermined threshold, the combining ratio of the value of the pixel generated by interpolation is decreased, and the combining ratio of the pixel acquired by exposure is increased. This makes it possible to generate a high-dynamic-range image precisely reflecting the luminance distribution of an object.

In the above aspect, the corrected-image generating unit may include an interpolated-image generating unit that generates interpolated images individually for the plurality of pixel groups by interpolating the pixel values of the pixels acquired by exposure; and an exposure correcting unit that generates the corrected images by executing the exposure correction, in accordance with a ratio of the exposure periods, for the individual pixel values of the interpolated images generated by the interpolated-image generating unit.

Alternatively, in the above aspect, the corrected-image generating unit may include an exposure correcting unit that executes, in accordance with a ratio of the exposure periods, the exposure correction for the individual pixel values of the pixels acquired by exposure for each of the plurality of pixel groups; and an interpolated-image generating unit that generates the corrected images by interpolating the pixel values whose exposures have been corrected by the exposure correcting unit.

Furthermore, in the above aspect, the HDR combining unit may set the threshold in accordance with a noise level calculated from the pixel value of a pixel of interest or a local-average pixel value in a neighborhood thereof.

Accordingly, by using the threshold set in accordance with the noise level, it becomes possible to correct pixel-value differences caused by noise as well as pixel-value differences caused by interpolation errors, thereby generating a high-dynamic-range image precisely reflecting the luminance distribution of an object.

Alternatively, in the above aspect, the HDR combining unit may set the threshold in accordance with a contrast value in a local region in a neighborhood of a pixel of interest.

Accordingly, replacement of pixel values due to noise becomes less likely to occur in regions of low contrast. This serves to suppress noise in regions of low contrast, where noise tends to matter.

Advantageous Effects of Invention

According to the aforementioned aspects, an advantage is afforded in that it is possible to simply obtain an HDR image having a resolution corresponding to the pixel pitch of an imaging element from signals acquired by the imaging element, the imaging element including pixels that are exposed for different exposure periods.

REFERENCE SIGNS LIST

1 Imaging device
2 Imaging unit (image acquisition unit)
7 Corrected-image generating unit
8 HDR combining unit

The invention claimed is:

1. An imaging device comprising:
an image acquisition unit comprising a lens which collects light from an object to form an image of the object, and an imaging element which captures the image, the imaging element comprising a plurality of pixel groups controlled to have different exposure periods, such that the image acquisition unit acquires the image as an original image in which pixels with different exposure periods coexist; and
a processor configured to perform processes comprising:
  a corrected-image generating process which generates corrected images individually for the plurality of pixel groups, the corrected images being generated by interpolating pixel values and executing exposure correction; and
  an HDR combining process which combines the corrected images respectively generated for the plurality of pixel groups by the corrected-image generating process,
  wherein, in a case in which a difference between (i) a first pixel value of a first pixel in the corrected image corresponding to a first one of the pixel groups, in the first pixel value being acquired by exposure, and (ii) a second pixel value of a second pixel in the corrected image corresponding to a second one of the pixel groups, the second pixel value being generated by interpolation, and the first and second pixels being at the same position, is greater than or equal to a predetermined threshold, the processor, in the HDR combining process, increases a combining ratio by which the first pixel in the corrected image corresponding to the first one of the pixel groups is combined.

2. The imaging device according to claim 1, wherein the corrected-image generating process includes:
an interpolated-image generating process which generates interpolated images individually for the plurality of pixel groups by interpolating the pixel values of the pixels acquired by exposure; and
an exposure correcting process which generates the corrected images by executing the exposure correction, in accordance with a ratio of the exposure periods, for the individual pixel values of the interpolated images generated by the interpolated-image generating process.

3. The imaging device according to claim 1, wherein the corrected-image generating process includes:
   an exposure correcting process that executes, in accordance with a ratio of the exposure periods, the exposure correction for the individual pixel values of the pixels acquired by exposure for each of the plurality of pixel groups; and
   an interpolated-image generating process that generates the corrected images by interpolating the pixel values whose exposures have been corrected by the exposure correcting process.

4. The imaging device according to claim 1, wherein the HDR combining process sets the threshold in accordance with a noise level calculated from the pixel value of a pixel of interest or a local-average pixel value in a neighborhood thereof.

5. The imaging device according to claim 1, wherein the HDR combining process sets the threshold in accordance with a contrast value in a local region in a neighborhood of a pixel of interest.

* * * * *